United States Patent
Chen et al.

(10) Patent No.: US 8,443,447 B1
(45) Date of Patent: May 14, 2013

(54) APPARATUS AND METHOD FOR DETECTING MALWARE-INFECTED ELECTRONIC MAIL

(75) Inventors: Chih-Sheng Chen, Taipei (TW); Shr-An Su, Taipei (TW); Yao-Tang Chang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 442 days.

(21) Appl. No.: 12/536,725

(22) Filed: Aug. 6, 2009

(51) Int. Cl.
*H04L 12/26* (2006.01)

(52) U.S. Cl.
USPC .................................. 726/24; 713/188

(58) Field of Classification Search .............. 726/22–24; 713/188; 709/204–207
See application file for complete search history.

(56) References Cited

U.S. PATENT DOCUMENTS

| | | | |
|---|---|---|---|
| 5,889,943 A | 3/1999 | Ji et al. | |
| 6,910,134 B1 | 6/2005 | Maher, III et al. | |
| 7,219,148 B2 * | 5/2007 | Rounthwaite et al. | 709/224 |
| 7,302,706 B1 * | 11/2007 | Hicks et al. | 726/24 |
| 7,433,923 B2 * | 10/2008 | Adkins | 709/206 |
| 7,526,809 B2 * | 4/2009 | Liang et al. | 726/24 |
| 7,657,935 B2 * | 2/2010 | Stolfo et al. | 726/22 |
| 7,693,945 B1 * | 4/2010 | Dulitz et al. | 709/206 |
| 7,716,297 B1 * | 5/2010 | Wittel et al. | 709/206 |
| 7,895,340 B2 * | 2/2011 | Bates et al. | 709/228 |
| 7,996,905 B2 * | 8/2011 | Arnold et al. | 726/24 |
| 2002/0004908 A1 | 1/2002 | Galea | |
| 2003/0120950 A1 * | 6/2003 | Hunt | 713/200 |
| 2003/0167402 A1 * | 9/2003 | Stolfo et al. | 713/200 |
| 2004/0054742 A1 | 3/2004 | Gruper | |
| 2004/0181580 A1 * | 9/2004 | Baranshamaje | 709/206 |
| 2005/0010814 A1 | 1/2005 | Lim et al. | |
| 2005/0120230 A1 | 6/2005 | Waterson | |
| 2005/0198125 A1 * | 9/2005 | Macleod Beck et al. | 709/204 |
| 2006/0272017 A1 | 11/2006 | Largman et al. | |
| 2007/0028301 A1 * | 2/2007 | Shull et al. | 726/22 |
| 2007/0101430 A1 * | 5/2007 | Raikar | 726/24 |
| 2007/0136808 A1 | 6/2007 | Xiong | |
| 2007/0240216 A1 | 10/2007 | O'Sullivan | |
| 2009/0013374 A1 * | 1/2009 | Tsai | 726/1 |
| 2009/0041217 A1 * | 2/2009 | Balk et al. | 379/93.01 |
| 2009/0064330 A1 * | 3/2009 | Shraim et al. | 726/22 |
| 2010/0095377 A1 * | 4/2010 | Krywaniuk | 726/22 |
| 2010/0263045 A1 * | 10/2010 | Dulitz et al. | 726/22 |

* cited by examiner

*Primary Examiner* — Gilberto Barron, Jr.
*Assistant Examiner* — Abdulhakim Nobahar
(74) *Attorney, Agent, or Firm* — Okamoto & Benedicto LLP

(57) ABSTRACT

One embodiment relates to a computer-implemented method for detecting malware-infected electronic mail messages. A server computer monitors an email account which is associated with a unique email address for receipt of an email message, the unique email address being associated with a unique contact in an address book on a client computer. The server computer determines that an email message addressed to the unique email address has been received and performs automated analysis to confirm that the email message contains malware. Other embodiments, aspects and features are also disclosed.

17 Claims, 3 Drawing Sheets

APPARATUS AND METHOD FOR DETECTING MALWARE-INFECTED ELECTRONIC MAIL

BACKGROUND OF THE INVENTION

1. Field of the Invention

The present invention relates generally to computer network security, and more particularly, but not exclusively, to detecting malware-infected electronic mail and suppressing the spread thereof.

2. Description of the Background Art

Electronic mail ("email") has become a relatively common means of communication among individuals with access to a computer network, such as the Internet. Among its advantages, email is relatively convenient, fast, and cost-effective compared to traditional mail. It is thus no surprise that a lot of businesses and home computer users have some form of email access.

A popular email client program includes an easy-to-use programming model. Such a programming model may be used by a virus to propagate itself by reading an email address book and sending new virus-infected messages to email addresses found therein. These new virus-infected messages are especially effective in spreading the virus because of the level of trust typically given to messages received from a known person.

Hence, it is highly desirable to detect these kinds of threats at an early stage. It is also highly desirable to provide solutions to users for limiting damage that may be caused by having sent out of the virus-infected messages.

SUMMARY

One embodiment relates to a computer-implemented method for detecting malware-infected electronic mail messages. A server computer monitors an email account which is associated with a unique email address for receipt of an email message, the unique email address being associated with a unique contact in an address book on a client computer. The server computer determines that an email message addressed to the unique email address has been received and performs automated analysis to confirm that the email message contains malware.

Another embodiment relates to a server computer apparatus for detecting malware-infected electronic mail messages. The apparatus includes data storage configured to store computer-readable instruction code and data, and a processor configured to access the data storage and to execute said computer-readable instruction code. A security application comprising computer-readable instruction code stored in the data storage is configured to (i) monitor an electronic mail (email) account associated with a unique email address for receipt of an email message, the unique email address being associated with a unique contact in an address book on a client computer, (ii) determine that an email message addressed to the unique email address has been received, and (iii) alert a user which sent the email message. An analyzer comprising computer-readable instruction code stored in the data storage is configured to perform automated analysis to confirm that the email message contains malware.

Another embodiment relates to a client computer apparatus for detecting malware-infected electronic mail messages. The apparatus includes data storage configured to store computer-readable instruction code and data, and a processor configured to access the data storage and to execute said computer-readable instruction code. A security manager comprising computer-readable instruction code stored in the data storage is configured to (i) subscribe to an electronic mail (email) security service, (ii) have a unique contact included in an address book of an electronic mail (email) application, wherein the unique email address is associated with a unique contact in an address book on a client computer and is further associated with an email account at a server computer, and (iii) receive a communication from the server computer if an email message addressed to the unique email address has been received.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

Current technology has limited capabilities for detecting email viruses and limiting their spread. Attachments which are "known bad" may be blocked at a server or by an email client. Anti-spam and anti-virus applications may be used to block the virus spread, and protection provided by an email client or web browser may be enhanced by way of receiving the latest updates or patches to those applications.

These conventional solutions have various limitations and disadvantages. First, newly created and distributed virus-infected emails are generally not blocked. Second, email messages exploiting certain vulnerabilities in HTML mail (which uses a subset of hyper text markup language to provide formatting and markup capabilities) may force a malicious file attachment to execute even if the user only views it in the preview pane or opens the message. Third, web-based email users lack local protection against email viruses. Fourth, security provided by an email client application may be avoided by email viruses having their own SMTP (simple mail transfer protocol) engines. Finally, users do not actually know they have sent out virus-infected emails until they are told so by their recipients.

The present application discloses a particularly advantageous solution to detecting email viruses and limiting their spread. The disclosed solution provides "customized pitfalls" for virus writers and a mutual feedback channel for email users. The solution is now described with reference to the figures of the present application.

Figure 1:
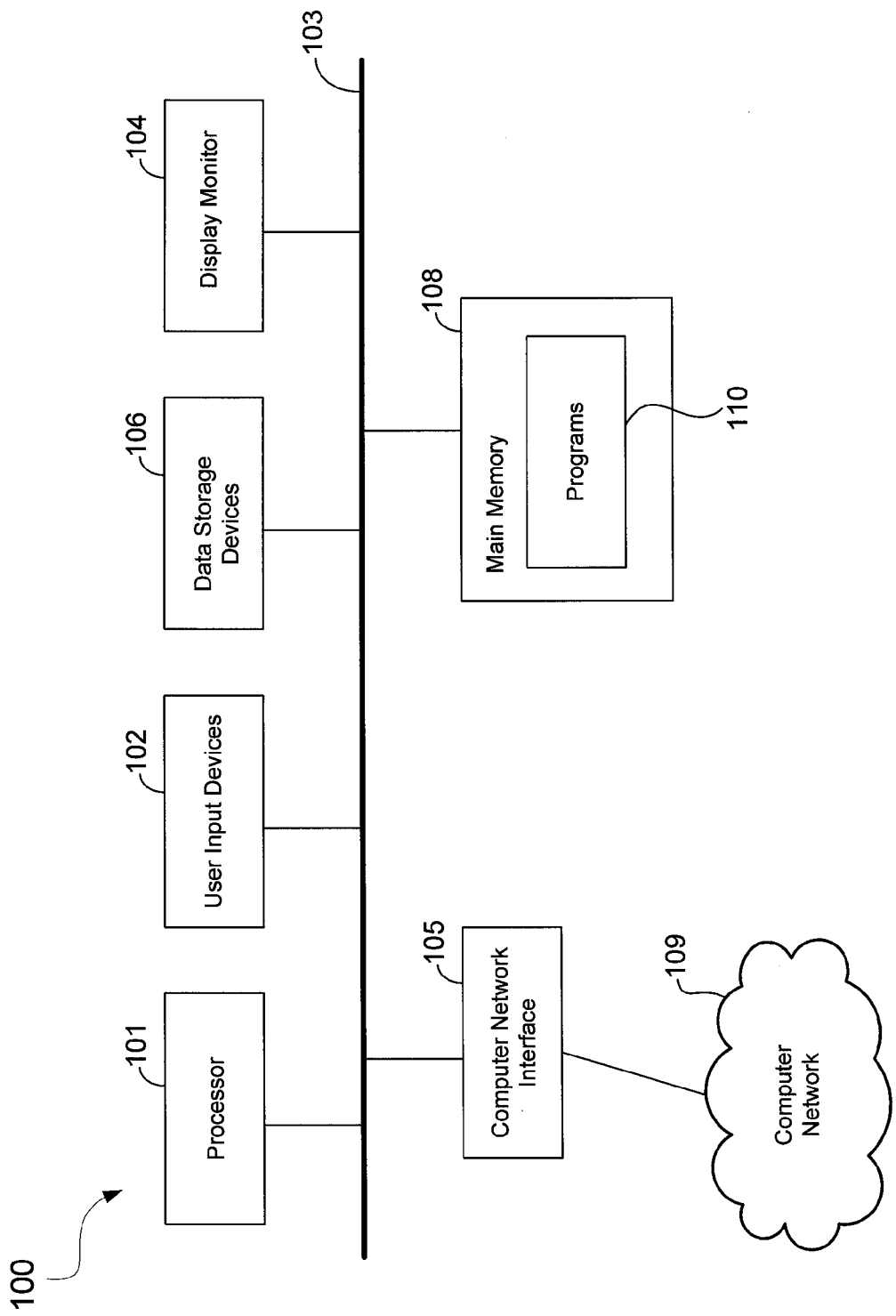
FIG. 1 shows a schematic diagram of an example computer that may be used in embodiments of the present invention.

Referring now to FIG. 1, there is shown a schematic diagram of an example computer that may be used in embodiments of the present invention. The computer shown in the example of FIG. 1 may be employed as a client computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse, etc.), a display monitor 104 (e.g., LCD, cathode ray tube, flat panel display, etc.), a computer network or communications interface 105 (e.g., network adapters, wireless network adapters, etc.) for communicating over a computer (data) network 109, one or more data storage devices 106 (e.g., hard disk drive, optical drive, FLASH memory, etc.) for storing computer-readable data onto computer-readable media and for reading the data therefrom, and a main memory 108 (e.g., DRAM, SRAM, etc.).

Computer-readable data (including computer-readable program instructions) may be stored in the data storage devices 106 and may be loaded into main memory 108. Computer-readable data may also be received over the computer network 109 by way of a communications interface 105. In the example of FIG. 1, main memory 108 may include various programs 110 which may be executed by the processor 101. The programs 110 may comprise computer-readable instruction code (and other data).

Figure 2:
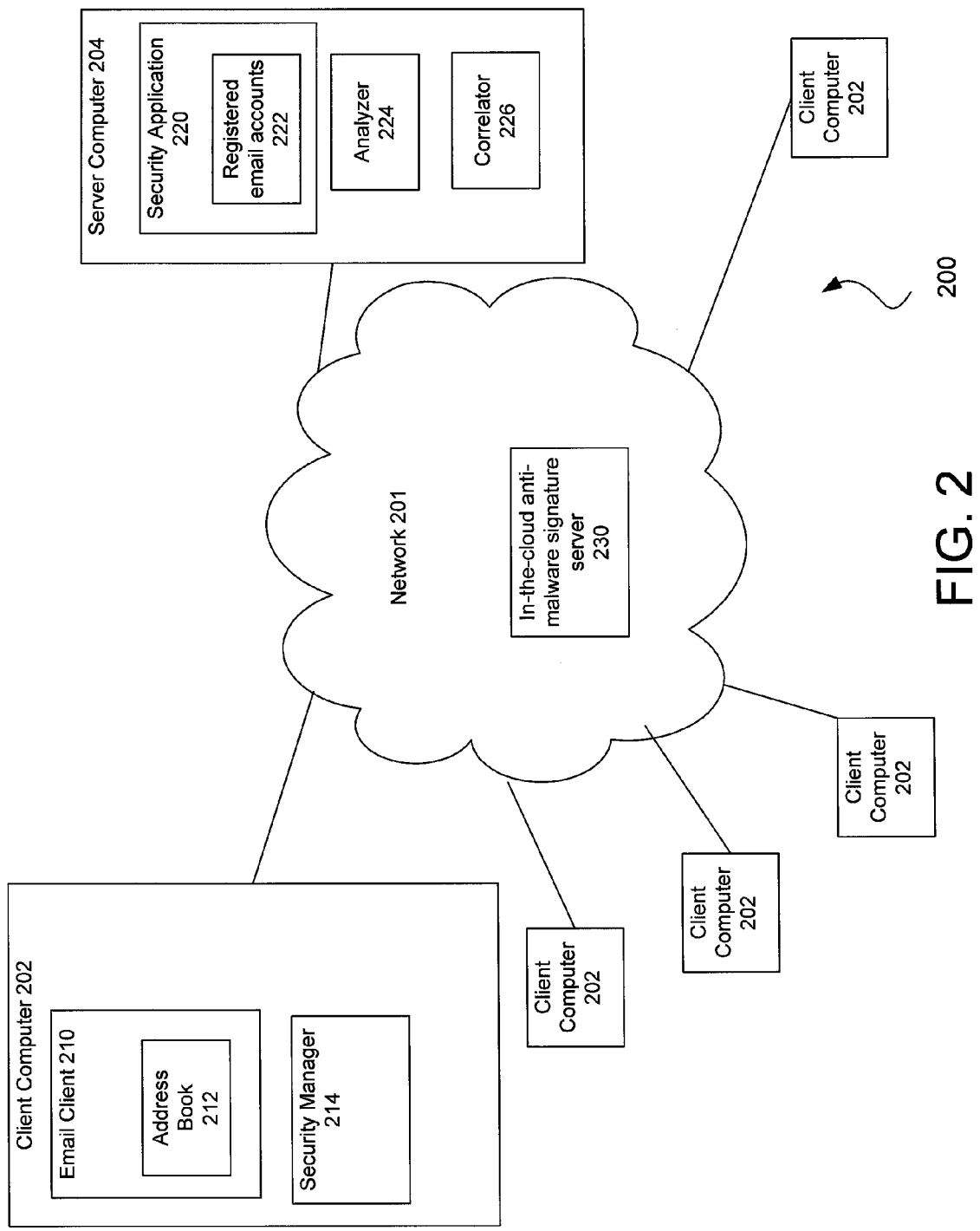
FIG. 2 is a schematic diagram of an apparatus for detecting virus-infected electronic mail and suppressing the spread thereof in accordance with an embodiment of the present invention.

FIG. 2 is a schematic diagram of an apparatus for detecting virus-infected electronic mail and suppressing the spread thereof in accordance with an embodiment of the present invention. In the example of FIG. 2, the apparatus 200 includes multiple client computers ("clients") 202 and one or more server computers ("servers") 204. As shown, the various computers may be communicatively interconnected by way of a network 201, such as the Internet. The client computers 202 may communicate with the server computer 204 by way of the network 201.

Select components in a client computer 202 and in a server computer 204 are shown. As shown, the client 202 may include, among other components, an electronic mail client ("email client") 210 and a security manager 214. As further shown, the server 204 may include, among other components, a security application 220 which may be configured to receive emails addressed to registered email accounts 222. In addition, the server 204 may further include an analyzer 224 and a correlator 226 to analyze and correlate messages so as to determine and confirm the presence of viruses therein. An in-the-cloud malware signature server 230 is also depicted and may be utilized in accordance with an embodiment of the invention. These components may be implemented as one or more executable software programs. In accordance with an embodiment of the present invention, select operations of the various computers are described further below in relation to the flow chart of FIG. 3.

Figure 3:
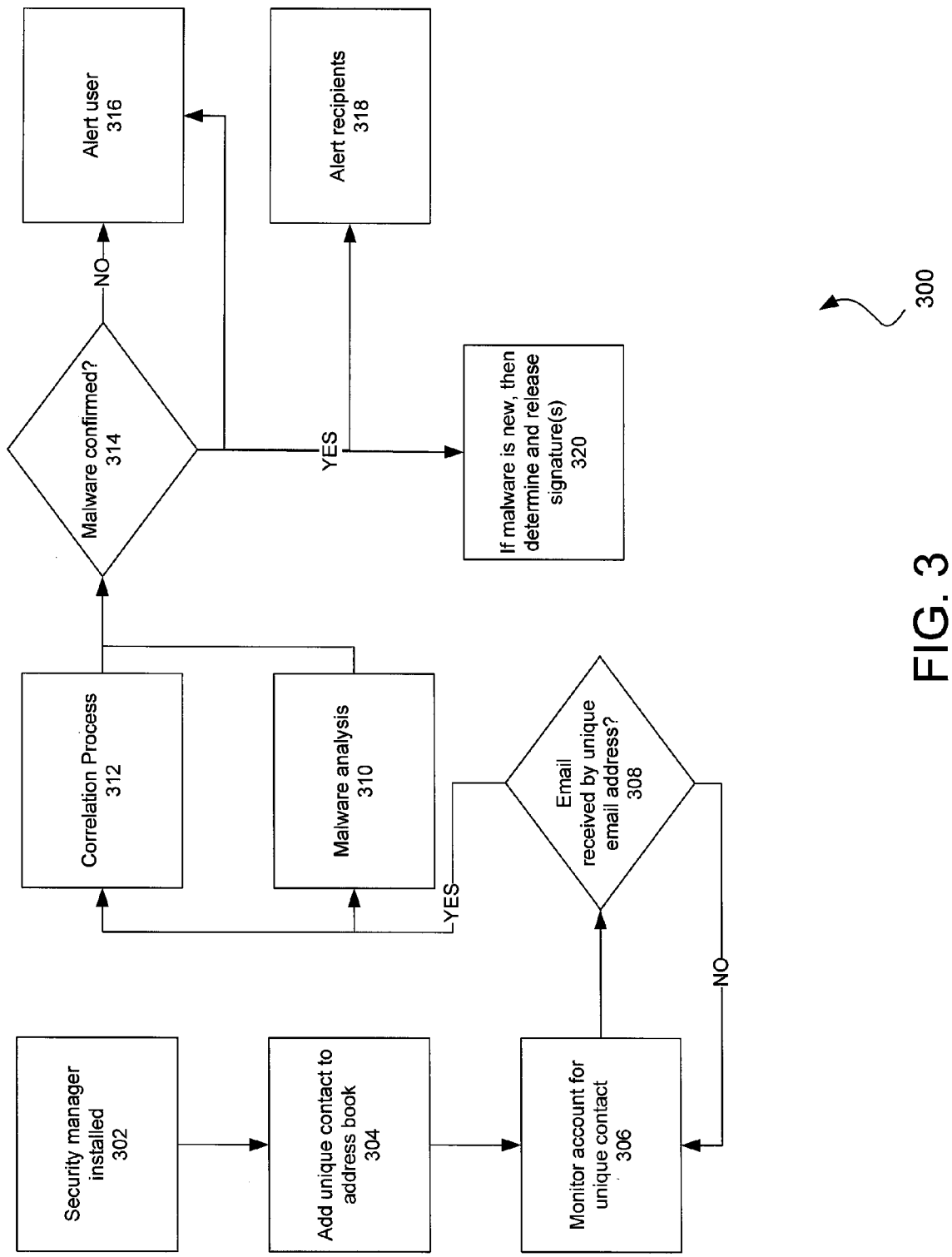
FIG. 3 is a flow diagram of a method of detecting virus-infected electronic mail and suppressing the spread thereof in accordance with an embodiment of the present invention.

FIG. 3 is a flow diagram of a method 300 of detecting virus-infected electronic mail and suppressing the spread thereof in accordance with an embodiment of the present invention. As shown, a security manager 214 is installed 302 on a client computer 202. Thereafter, a "customized pitfall" for email viruses may be set-up and utilized as follows.

First, the security manager 214 may add 304 a unique contact to an address book 212 of an email client 210 on the client computer 202. The unique contact comprises a unique email address. The unique email address may be associated with a registered email account 222 at the server 204 such that emails sent to the unique email address are received by the registered user account. Alternatively, the unique contact may be added manually to the address book 212, instead of being added by the security manager 214.

After the unique contact has been added, the registered user account may be monitored 306 by the security application 220 at the server 204. The monitoring determines 308 whether the unique email address of the registered user account has received an email. Until an email message is received at the unique email address, the monitoring 306 continues. If an email message is received at the unique email address of the registered user account (i.e. if the "customized pitfall" is triggered), then automated malware analysis 310 and/or an automated correlation process 312 may be performed on the email message to determine if the message contains a computer virus or other malware. The malware analysis 310 and/or the correlation process 312 may confirm 314 that the email message contains a virus or other malware.

The automated malware analysis 310 may be performed by an analyzer 224 at the server 204. The analyzer 224 may utilize, for example, a pattern-based antivirus scanning engine. Such a scanning engine is effective in detecting (confirming the presence of) "known" viruses whose signatures have been previously determined.

The automated correlation process 312 may be performed by a correlator 226 at the server 204. The correlation process 312 may correlate emails received by multiple registered user accounts 222, each registered user account 222 being associated with a unique email address at a client computer 202. The receipt of a same or similar message by many unique email accounts, each set up as a customized pitfall, is a strong indication of the presence of a virus in the message(s).

If the presence of virus or other malware is not confirmed, then an alert may be sent 316 to the user alone, without directly alerting the recipients. For example, the alert may be an email that is sent 316 from the security application 220 at the server 204 to the email account from which the infected messages were sent. Since the message is not confirmed as malware, the alert may indicate that the message sent did not appear to be malicious but that it is unusual or abnormal for a message to be sent to the unique email address. As another example, the security application 220 at the server 204 may indicate to the security manager 214 at the client 202 that a message was sent to the unique email address, and the user may be so alerted by security manager 214.

If the presence of the virus or other malware is confirmed, then an alert may be sent 316 to the user, and an alert may also be sent 318 to the recipients of the infected email message. In this case, since the message is confirmed as malware, the alert to the user may indicate that the message sent contained a virus or other malware, and that recipients of the infected email message have also been notified. The alert to the recipients may be sent, for example, by the server 204 indicating the confirmed malicious message to the security manager 214, and the security manager 214 sending out emails to alert the recipients. The alert email to the recipients may be sent, for example, using a "reply all" type feature and may list the recipient addresses in a blind carbon copy (BCC) field for preservation of privacy. The alert email to the recipients may state, for example, something like the following. "Caution! The message sent by user@domain.com was confirmed to be infected with malware by the Trend Micro Smart Protection Network. Please do not open the attachment file(s) or your computer may also become infected. If you have already opened the file(s), please scan your computer with our free online scanner or free trial Internet Security Suite." A hypertext link to the online malware scanner and/or a security suite may also be included. Of course, the specific language of the alert message may vary from that particular example.

Furthermore, in accordance with an embodiment of the invention, if the malware detected is new (in that it is not a "known" malware whose signatures is already known by the system), then the server 204 may determine and release 320 a signature or signatures of the new malware. The signature(s) may be released, for example, to client computers 202, or more efficiently, to an in-the-cloud anti-malware signature server 230 which may be used to update malware signatures at the client computers 202. The signature(s) may comprise, for example, Virus Scanning Application Program (VSAPI) or anti-spam patterns.

The technique described above in relation to FIG. 3 is highly effective in detecting virus-infected email. This is because receipt of an email by the unique email address indicates that it is likely that a virus has attempted to propagate itself by reading the address book 212 and sent new virus-infected messages to contacts therein. The new virus-infected messages indicate that they are from the email account of the innocent user, so the messages are especially likely to be trusted and opened.

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

What is claimed is:

1. A computer-implemented method for detecting malware-infected electronic mail messages, the method comprising:
   monitoring, by a server computer, an electronic mail (email) account associated with a unique email address for receipt of an email message, the unique email address being associated with a unique contact in an address book on a client computer;
   determining, by the server computer, that an email message addressed to the unique email address has been received, wherein receipt of the email message addressed to the unique mail address indicates to the server computer that malware has attempted to propagate by reading the address book on the client computer and sending the email message addressed to the unique email address; and
   performing both an automated malware analysis and an automated correlation process by the server computer to confirm that the email message contains malware, wherein the automated malware analysis is performed by a pattern-based antivirus scanning engine, and the automated correlation process determines whether a plurality of similar emails have been received by multiple registered user accounts, each said registered user account being associated with a unique email address at a client computer, in order to confirm that the email message contains malware.

2. The method of claim 1, further comprising:
   alerting a user which sent the email message.

3. The method of claim 2, wherein alerting the user comprises sending an email from the server computer to an email account from which the email message was sent.

4. The method of claim 2, wherein alerting the user comprises the server computer communicating to a security manager at the client computer that a message was sent to the unique email address.

5. The method of claim 1, further comprising:
   alerting recipients of the email message if the email message is confirmed to contain malware.

6. The method of claim 5, wherein alerting the recipients comprises the server computer communicating with a security manager at the client computer, and the security manager causing emails to be sent out to alert the recipients.

7. The method of claim 6, wherein the emails sent out to alert the recipients provide a link to an online malware scanner.

8. The method of claim 5, further comprising:
   determining a signature for the malware if the malware is determined to be new; and
   releasing the signature to a plurality of client computers.

9. The method of claim 8, wherein the signature is released to an in-the-cloud anti-malware signature server.

10. A computer apparatus for detecting malware-infected electronic mail messages, the apparatus comprising:
    data storage configured to store computer-readable instruction code and data;
    a processor configured to access the data storage and to execute said computer-readable instruction code;
    a security application comprising the computer-readable instruction code stored in the data storage which is configured to (i) monitor an electronic mail (email) account associated with a unique email address for receipt of email messages, the unique email address being associated with a unique contact in an address book on a client computer, (ii) determine that an email message addressed to the unique email address has been received, wherein receipt of the email message addressed to the unique mail address indicates that malware has attempted to propagate by reading the address book on the client computer and sending the email message addressed to the unique email address, and (iii) alert a user which sent the email message;
    an analyzer comprising further computer-readable instruction code stored in the data storage which is configured to perform automated malware analysis using a pattern-based antivirus scanning engine to confirm that the email message contains malware; and
    a correlator comprising further computer-readable instruction code stored in the data storage which is configured to determine whether a plurality of similar emails have been received by multiple registered user accounts, each said registered user account being associated with a unique email address at a client computer, in order to confirm that the email message contains malware.

11. The apparatus of claim 10, wherein the security application is configured to alert the user by sending an email from the server computer to an email account from which the email message was sent.

12. The apparatus of claim 10, wherein the security application is configured to alert the user by communicating to a security manager at the client computer that a message was sent to the unique email address.

13. The apparatus of claim 10, further comprising:
computer-readable instruction code stored in data storage and configured to alert recipients of the email message if the email message is confirmed to contain malware.

14. The apparatus of claim 13, wherein alerting the recipients comprises communicating with a security manager at the client computer such that the security manager causes emails to be sent out to alert the recipients.

15. The apparatus of claim 10, further comprising:
computer-readable instruction code stored in data storage and configured to determine a signature for the malware and release the signature to an in-the-cloud anti-malware signature server if the email message is confirmed to contain malware and determined to be new.

16. A computer apparatus for detecting malware-infected electronic mail messages, the apparatus comprising:
data storage configured to store computer-readable instruction code and data;
a processor configured to access the data storage and to execute said computer-readable instruction code;
a security manager comprising the computer-readable instruction code stored in the data storage which is configured to
subscribe to an electronic mail (email) security service such that a unique contact is added to an address book of an email application, wherein a unique email address is associated with the unique contact in the address book on a client computer and is further associated with an email account at a server computer, and
receive a communication from the server computer if an email message addressed to the unique email address has been received and has been confirmed to contain malware using both an automated malware analysis and an automated correlation process, wherein receipt of the email message addressed to the unique mail address indicates to the server manager that malware has attempted to propagate by reading the address book on the client computer and sending the email message addressed to the unique email address, and wherein the automated correlation process determines whether a plurality of similar emails have been received by multiple registered user accounts, each said registered user account being associated with a unique email address at a client computer, in order to confirm that the email message contains malware.

17. The apparatus of claim 16, wherein the security manager is further configured to alert other recipients of the email message if the email message is confirmed to contain malware.

* * * * *